United States Patent
Kauffman et al.

(10) Patent No.: US 6,869,632 B2
(45) Date of Patent: *Mar. 22, 2005

(54) METHOD OF IMPROVING DRIP LOSS IN FRESH BEEF, PORK, AND POULTRY

(75) Inventors: Robert G. Kauffman, Madison, WI (US); Marion L. Greaser, Middleton, WI (US); Edward Pospiech, Paznan (PL); Ronald L. Russell, Brooklyn, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 43 days.

This patent is subject to a terminal disclaimer.

(21) Appl. No.: 10/391,915

(22) Filed: Mar. 19, 2003

(65) Prior Publication Data

US 2003/0175391 A1 Sep. 18, 2003

Related U.S. Application Data

(63) Continuation of application No. 09/300,755, filed on Apr. 26, 1999, now abandoned, which is a continuation-in-part of application No. 08/869,790, filed on Jun. 5, 1997, now Pat. No. 6,020,012.

(60) Provisional application No. 60/019,291, filed on Jun. 7, 1996.

(51) Int. Cl.$^7$ .......................... A23L 1/314; A23L 1/318
(52) U.S. Cl. ....................... 426/281; 426/332; 426/641
(58) Field of Search ................................ 426/281, 332, 426/641

(56) References Cited

U.S. PATENT DOCUMENTS 4,543,260 A * 9/1985 Brotsky ...................... 426/266

FOREIGN PATENT DOCUMENTS

EP 0209268 * 1/1987

* cited by examiner

*Primary Examiner*—Arthur L. Corbin
(74) *Attorney, Agent, or Firm*—Joseph T. Leone, Esq.; DeWitt Ross & Stevens S.C.

(57) ABSTRACT

A method of improving the color, water-holding capacity, and organoleptic qualities of beef, pork, lamb, veal, and poultry by injecting or perfusing a solution of sodium bicarbonate into a carcass or parts thereof is disclosed.

19 Claims, No Drawings

METHOD OF IMPROVING DRIP LOSS IN FRESH BEEF, PORK, AND POULTRY

CROSS-REFERENCE TO RELATED APPLICATIONS

This is a Continuation of application Ser. No. 09/300,755, filed Apr. 26, 1999, now-abandoned, which is a Continuation in Part of application Ser. No. 08/869,790, filed Jun. 5, 1997, now U.S. Pat. No. 6,020,012, issued Feb. 1, 2000, which claims priority to Provisional Application Ser. No. 60/019,291, filed Jun. 7, 1996.

FEDERAL FUNDING STATEMENT

This invention was made with the United States government support awarded by following agencies: USDA/CSREES 97-CRHF-0-6055. The Unites States has certain rights in this invention.

FIELD OF THE INVENTION

The present invention is drawn to a method of improving the water-holding capacity (WHC), color, and organoleptic properties of fresh meats, including beef, pork, amd poultry, by injecting or perfusing a post-rigor carcass or parts thereof with one or more solutions containing sodium bicarbonate.

BACKGROUND

Consumers purchase meat products after making judgments about the quality and price of the meat. Consumers often use color to judge the ultimate tenderness and taste of the meat product. However, such quality attributes are often difficult to quantify from visual appraisal.

For purposes of this application, the terms "meat(s)" or "meat product(s)" are synonymous and refer to the fresh cuts of meat offered to the wholesale and retail buying public. The term "carcass" refers to fresh, whole, meat-animal carcasses. The term "parts thereof" when refering to "carcass" refers to still-whole or disassembled parts of a meat-animal carcass, such as the conventional cuts or portions in which meat is packaged for sale to wholesalers, as well as the further cuts or portions into which meat is rendered for sale to consumers.

Because most meat products, and fresh meats in particular, are purchased based upon a visual inspection of the product, abnormal coloration has an adverse effect on the salability of the product (Topel et al., 1976; Wachholz et al., 1978). Moreover, pale pork is more susceptible to further discoloration during retail display (Topel et al., 1976; Greer and Murray, 1988).

While the discussion which follows is largely limited to pork, this limitation is for brevity only. The invention described hereinbelow functions with equal success in the treatment of poultry, such as chickens, turkeys, and the like, as well as beef, lamb, and veal.

In order to more objectively judge pork quality, four categories have been developed to describe the visual appearance of fresh pork. These four categories are described in Table 1 as follows (see, for instance, Joo, 1995):

TABLE 1

| Category | Description | Quality | pH | Percent Drip |
|---|---|---|---|---|
| RFN | Reddish pink, Firm Non-exudative | Ideal | <6.0 | <6.0 |

TABLE 1-continued

| Category | Description | Quality | pH | Percent Drip |
|---|---|---|---|---|
| RSE | Reddish pink, Soft and floppy, Exudative | Questionable | <6.0 | >6.0 |
| PSE | Pale pinkish gray, very Soft and floppy, very Exudative | Poor | <6.0 | >6.0 |
| DFD | Dark purplish red, very Firm, Dry (free of surface fluids) | Varied: may be juicy, tender, spoils easily | >6.0 | <3.0 |

It is known that a rapid fall in pH within pork immediately post-mortem, while muscle temperature remains high, results in acidic conditions which give rise to lower quality PSE meat. This effect is most notable in the loins and hams. This rapid fall is believed to be the result of rapid glycolysis of glycogen in muscles which results in denaturation of proteins. The occurrence of PSE is known to be affected by pre-slaughter stress as well as the genetic makeup of the pig. The occurrence of lower quality PSE meat has risen as pigs have been bred to yield leaner carcasses.

From an economic standpoint, PSE meat represents a tremendous loss in value to pork producers because the loins and hams of a slaughtered pig represent approximately one-third of the musculature on the carcass and approximately one-half of the market value of the carcass. Lowered quality of these important cuts of meat greatly reduces the economic return to pork producers and packers.

A 1992 survey of pork quality published by the National Pork Producers Council (NPPC) included data from fourteen slaughtering plants and represented 10,753 gluteus medius muscles (muscles in the ham). The survey found 16 percent of these hams to be PSE and 10 percent to be DFD pork, proportions the NPPC felt should be of concern to the industry. Importantly, over half of the hams were RSE, possessing normal color, but accompanied by a soft, floppy, and exudative condition. The NPPC recommended, among other things, that color, water-holding capacity, pH, and marbling content be recorded for each carcass and included in every packer report to producers, so that the industry can remain informed of quality variations and can take appropriate steps to improve breeding stock. The NPPC also recommended the adoption of price differentials for differences in quality, similar to those which exist for leanness. These results and recommendations stress a long-felt need to better understand the problem of PSE-RSE so that it can be predicted, controlled, and prevented.

As alluded to above, the economic losses associated with the occurrence of PSE and RSE pork are extensive (Carr et al., 1997). Direct costs include reduced yields in the carcass, as well as reduced yields in wholesale and retail cuts used for processing and cooking. Indirect costs include an increase in product variability and a reduction in consumer appeal due to poor color, drip loss in retail display (Kauffman et al., 1978; Smith and Lesser, 1982), variation in organoleptic qualities in cooked hams (Honkavaara, 1988), and reduced juiciness after cooking (Bennet et al. 1973; Jeremiah, 1984).

In 1982, the reduced financial return of a PSE carcass was calculated to range from zero to $16 in the U.K. (Smith and Lesser, 1982). The benefits of lowering the incidence of PSE pork by only 1% were estimated to be worth about $5 million per annum to the Australian pig industry, with 85% of the returns accruing to producers (Voon, 1991). The Pork Chain Quality Audit (Meeker and Sonka, 1994) suggests that pork quality problems currently are costing the industry in excess of $50 million per annum. A similar study by Carr et al., 1997, estimates that pork quality problems in the U.S. result in lost revenues of approximately $75 to $150 million annually (1996 dollars).

The water-holding capacity (WHC) of fresh pork and the binding of added water during storage and further processing are also of significance to the pork industry. Water retention is essential for pork palatability in terms of juiciness and possibly tenderness. Furthermore, loss of fluids (often in excess of 7%) results in a reduction in the weight of marketable pork. The occurrence of a pale color and high exudation or a dark color and minimal exudation has led to the assumption that color and WHC are related. However, van Laack et al. (1994) and *Warriss and Brown* (1987) have demonstrated that color and WHC are not necessarily related, especially within the reddish-pink range (RFN, RSE).

Fresh pork at slaughter contains about 75% water, and about 85% of this muscle tissue water is located intracellularly, primarily in the spaces between the thick and thin filaments. The remaining 15% of the water in fresh pork is located in the extracellular spaces (*Hamm*, 1975). Changes in WHC result from changes of the filament spacing associated with changes in the ionic charge and structure of the myofibrillar proteins, especially myosin. Swelling or shrinkage of the muscle fiber results in changes in the filament spacing and causes water movement between the intracellular and extracellular spaces (*Offer and Knight*, 1988). During the conversion of muscle to pork and subsequent aging of pork, the interfilament spacing can be changed by the rate and extent of pH fall, sarcomere length, ionic strength, osmotic pressure and onset of rigor mortis (*Hamm*, 1994; *Offer and Knight*, 1988; *Wismer-Pederson*, 1987).

The occurrence of PSE is known to be affected by ante-mortem factors such as pre-slaughter stress and the genetic makeup of the individual animal. The PSE condition is more likely to arise in white muscles, i.e. those muscles which have predominantly white fibers. These fibers have the capacity to undergo rapid postmortem glycolysis (pH decline) especially when there is antemortem stress (Warner et al., 1993). As noted above, the pork muscles that are subject to the PSE condition comprise approximately one-third of the total muscle mass.

Recent studies by Ahn et al. (1992), Boles et al. (1993; 1994) and Grzes et al. (1994) indicate that minute quantities of sodium bicarbonate (baking soda) have an elevating and stabilizing effect on the ultimate pH of muscle. However, it must be also noted that sodium bicarbonate was not effective when administered to live pigs prior to slaughter (Boles et al., 1994).

DETAILED DESCRIPTION OF THE INVENTION

The present inventors have found that injecting or perfusing a solution of sodium bicarbonate into meat-animal carcass, at any time after slaughter, improves the appearance, water-holding capacity (WHC) and oganoleptic quality of the meat. In pork, the treatment greatly inhibits the formation of PSE and RSE meat. The invention functions with equal success in other species of meat animals, although the invention is preferably practiced in the processing of pork.

The present inventors have found that injecting or perfusing a buffered solution of sodium bicarbonate into a freshly slaughtered carcass, preferably within 24 hours of slaughter, greatly inhibits the formation of PSE and RSE meat.

In practice, implementing the present invention is straightforward. In a first embodiment of the present invention, after stunning, bleeding and eviscerating the animal, the carcass is skinned, defatted, optionally disassembled, and refrigerated (not frozen). The musculature is then injected with a sodium bicarbonate solution. Provided that the carcass or disassembled carcass is chilled to prevent spoilage, the sodium bicarbonate solution may be injected or perfused into the carcass hours, or even days after slaughter. It is preferred, however, that the injection or perfusion take place within 96 hours post-mortem.

For transportation and storage purposes, the carcass (or parts thereof) is then either chilled at 4° C. or crust chilled at −15° C. until the meat reaches a core temperature of 4° C.

Injection of the carcass can be accomplished using any number of commercially available injection devices. Such devices are well known to those skilled in the field of meat processing. A typical device includes a pressurized reservoir to contain the solution. The reservoir is then connected by suitable conduit means to a valve-controlled injector head bearing one or more hollow injector needles.

A second embodiment of the present invention proceeds in the same fashion as noted above, with the exception that the carcass or parts thereof are perfused with a sodium bicarbonate solution. In pork, the perfusion is preferably performed via the iliac artery, which forces the solution into the pelvic limbs. In other species of meat animals, the perfusion can be through any major blood vessel which affords perfusion to the majority of meat on the carcass.

For any carcass treated, the sodium bicarbonate solution preferably has a concentration of between about 0.1 molar and 1.0 molar. More preferably still, the solution has a concentration of between about 0.5 and 1.0 molar sodium bicarbonate. More preferably still, the solution has a concentration of between about 0.6 and 1.0 M sodium bicarbonate. When the treatment is performed after the onset of rigor mortis, the sodium bicarbonate solution preferably has a concentration of between 0.6 and 1.0 M and is injected in an amount of about 10% wt/wt.

Optionally, a NaCl concentration of less than 1.0% (wt/vol) may be added to the solution. Further ingredients, such as sodium pyrophosphate, may also be injected into the carcass or parts thereof simultaneously with the sodium bicarbonate.

The carcass or the treated portions of the carcass may optionally be tumbled after the treatment in order afford more uniform distribution of the solution throughout the musculature. Tumbling apparatus is widely used in the meat-processing industry and is well known to those skilled in the art.

COMMERCIAL APPLICATIONS AND ADVANTAGES

Pork

Over 95 million pigs are slaughtered each year in the United States alone. European producers, especially in Denmark and The Netherlands, have taken steps to minimize variations in pork quality. The U.S. pork industry seems to have moved pork quality to the fore after the publication in 1995 of an NPPC evaluation of terminal-sire lines. That study showed that the U.S. industry suffers losses, both at the processor level and at the retail meat case, from substandard pork. The Japanese, who rely almost exclusively on imported pork, generally no longer accept PSE pork. This economic incentive appears to be driving U.S. industry to take steps to insure a high-quality product. By improving the quality of pork for human consumption, economic gains can be realized.

Additionally, a distinct advantage of using sodium bicarbonate is that sodium bicarbonate has been afforded "Generally Regarded as Safe" (GRAS) status by the U.S. government. Consequently, the treatment itself uses only compounds which are known to be safe for human consumption and which do not require further regulatory clearance.

The present invention is quite simple and can be optimized to accommodate the methods currently used in pork processing. Also, in pork, the method can be selectively used to treat only those carcasses identified to be at risk of becoming PSE.

Other Meat Animal Species

In other species of meat animals (poultry, beef, lamb, etc.), the main advantage afforded by the present invention is an increase in the beneficial organoleptic qualities of the salable meat product. The maintenance of a higher ultimate pH within the carcass and parts thereof as a result of the treatment appears to be a major factor in the favorable organoleptic results (although Applicants do not wish to be bound by this mechanistic interpretation).

In the same fashion as pork, it appears that a market-driven move toward producing leaner carcasses has resulted in an overall loss of meat product quality. By improving the organoleptic qualities of these meat products, producers can realize gains by reducing the proportion of their meat products which are judged by consumers to be of lower grade.

EXAMPLES

The following Examples are included herein solely to illustrate the practice of the present invention. The Examples do not limit the scope of the invention disclosed and claimed herein in any fashion.

Example 1

Select homozygous positive and heterozygous PSS (for the halothane gene) market-weight hogs are used in the studies. This ensures that the PSE and RSE conditions are available to be appropriately tested by the Example.

20 pigs are used for each treatment. Conventional slaughtering and chilling conditions are used. One side or limb of each pre-rigor carcass is used for experimental purposes, while the other side or limb is left untouched and processed simultaneously. This allows the right and left sides (or limbs) of each individual animal to serve as either controls or treatments:

A. Control: No additives, no defatting and normal chilling at 4° C. for 24 hours.

B. Ham-loin location skinned and defatted, chilled (crust-frozen) at −15° C. with maximum air velocity until center of ham reaches 4° C.

C. Immediately after evisceration (about 30 min), a dilute solution of sodium bicarbonate is injected into the loin (longissimus thoracis et lumborum) and ham (semimembranosus, semitendinosus, biceps femoris, and gluteus medius). The sides are chilled at 4° C.

D. (Combination of treatments B & C.) Immediately after stunning, bleeding and evisceration, one side of the carcass is skinned and defatted over the loin and ham and the musculature is injected with sodium bicarbonate and then either chilled at 4° C. for 24 hr or crust chilled at −15° C. until center of ham reaches 4° C.

E. For a limited number of pre-rigor carcasses (<10), sodium bicarbonate in saline solutions are perfused, via the iliac artery, into one pelvic limb (perfusing saline into the paired control limb, using identical procedures). This provides comparisons to test alternative delivery procedures for distributing food additives uniformly throughout the musculature. The limbs are chilled at 4° C. for 24 hr.

Partial data from Example 1 is presented in Tables 2–4 below:

Tables 2–4

Pre-rigor, postmortem longissimus lumborum pumped with $NaHCO_3$ (10% by wt).

TABLE 2

Post-rigor parameters at different anatomical locations of muscle

| Location | CONTROL | | | TREATMENT | | |
|---|---|---|---|---|---|---|
| cranial end | pH | L* † | % Drip + | pH | L* † | % Drip + |
| 1 | 5.41 | 50.7 | 7.2 | 5.37 | 47.0 | 3.9 |
| 2 | 5.42 | 50.7 | 6.6 | 5.40 | 46.6 | 2.9 |
| 3 | 5.41 | 48.5 | 4.8 | 5.40 | 44.3 | 1.8 |
| 4 | 5.42 | 49.9 | 4.9 | 5.41 | 44.9 | 4.3 |
| 5 | 5.43 | 48.5 | 4.3 | 5.44 | 44.9 | 5.6 |

+ % drip was estimated from filter paper fluid
† L* values:
>50 = pale
43–49 = normal reddish-pink range
<43 = dark

TABLE 3

Location about where pumping started on right side.
Measurements on treatment side were made in affected areas.

| | | | | | | |
|---|---|---|---|---|---|---|
| 6 | 5.44 | 48.0 | 4.1 | 5.90 | 43.1 | 5.1 |
| 7 | 5.44 | 47.1 | 4.0 | 6.52 | 44.1 | 4.5 |
| 8 | 5.43 | 47.7 | 3.0 | 6.56 | 44.9 | 3.8 |
| 9 | 5.44 | 47.2 | 4.0 | 5.69 | 43.3 | 3.3 |
| 10 | 5.44 | 47.4 | 3.3 | 6.56 | 40.3 | 2.8 |
| 11 | 5.44 | 51.6 | 5.8 | 6.62 | 37.0 | 2.8 |
| 12 | 5.45 | 50.5 | 5.7 | 6.65 | 38.6 | 2.4 |
| 13 caudal end | 5.48 | 52.4 | 5.2 | 6.20 | 41.8 | 2.6 |

TABLE 4

Pre-rigor pH changes over time postmortem (pm)

| Time pm (min) | Left pH (CONTROL) | Right pH (TREATMENT) | Carcass T (° C.) |
|---|---|---|---|
| 30 | 6.23 | 6.18 | 39.5 |
| | | Injection of NaHCO3 | |
| 40 | 6.21 | 6.30 | 39.0 |
| 60 | 6.02 | 6.78 | 30.0 |
| 90 | 5.97 | 6.65 | 26.0 |
| 120 | 5.95 | 6.45 | 22.0 |
| 150 | 5.94 | 6.61 | 19.0 |
| 180 | 5.75 | 6.67 | 16.0 |
| 210 | 5.70 | 6.33 | 14.0 |
| 240 | 5.64 | 6.25 | 12.5 |
| 270 | 5.50 | 6.40 | 11.0 |
| 300 | 5.47 | 6.20 | 10.0 |
| 24 hr | 5.40 | 6.00 | 4.0 |

Example 2

Approximately one liter of a solution of 10% sodium bicarbonate and 0.7 % NaCl was injected into the loin and ham muscles of 15 freshly slaughtered pigs. The loin and ham muscles were injected immediately after the animals had been stunned, bled, and skinned (about 15 minutes post-mortem, pre-rigor) Data from the 15 pigs (including 12 PSE pigs) is shown in Table 5 below:

TABLE 5

| Pre-injection category | Post-injection category | No. of animals |
|---|---|---|
| PSE | RFN | 7 |
| PSE | RSE | 4 |
| PSE | DFD | 1 |
| RFN | DFD | 1 |
| RSE | RFN | 2 |

Some darkening (DFD condition) was seen at the site of injection. However, 7 of 15 samples were converted from unacceptable to acceptable quality, and another 2 from questionable to acceptable quality. These results have been reproducible in duplicate experiments.

Samples of the muscles treated in this Example were broiled and taste-tested by a panel of volunteer graduate students. Overwhelmingly, the panel preferred the treated meat. The panel felt that the treated samples were much juicier and more tender than the untreated samples.

Example 3

Twenty stress-prone market pigs (possessing the genetic potential for producing PSE pork) were slaughtered over a period of three weeks. Pre-rigor ham and loin muscles from one side were removed immediately after bleeding and injected with a sodium bicarbonate solution (TREATMENT). Identical muscles from the opposite side were left intact for 24 hours under conventional processing procedures and then the muscles were removed (CONTROL). Light reflectance, % drip, and pH were measured on the muscles to establish quality classes. Taste panel evaluations were made to determine effect of treatment on palatability traits. Table 6 provides a summary of the results. The treatment changed the classification of all samples from PSE to RFN, and the flavor was not adversely influenced by inclusion of sodium bicarbonate.

TABLE 6

Influence of Injecting Sodium Bicarbonate into Pre-Rigor Pork Musculature

|  | CONTROL | TREATMENT |
|---|---|---|
| pH | 5.3 | 5.6** |
| L* | 53.5 | 46.5** |
| % Drip | 10.0 | 45** |
| Quality Class | PSE | RFN |
| Tenderness Score | 47 | 52 |
| Juiciness Score | 52 | 55 |
| Flavor Score | 47 | 56* |

*P < 0.05
**P < 0.01
N = 20
L* values:
>50 = pale in color
43–50 = reddish pink
<43 = dark
Panel scores range from 1 (very tough, very dry, or very undesirable flavor) to 100 (very, very tender, very juicy, or very desirable flavor).

Example 4

Nine cow semitendinosis muscles were collected from carcasses at 96 hours postmortem and divided into equal thirds. The first portion of loins was injected with a sodium bicarbonate solution (1 M sodium bicarbonate, 10% by weight), the second portion of loins was injected with 10% by weight water, and the third portion of loins was left untreated.

Eight samples from each portion (treatment, water-injection, and control) were then subjected to shear force testing using a Warner-Bratzler shear device (for a total of 72 data points per group). A Warner-Bratzler shear device provides objective data on the force required to shear the meat fibers. This provides an objective measure of tenderness. The results were as follows:

|  | Shear |
|---|---|
| Treatment with 1.0 M Sodium Bicarbonate | 5.736 |
| Water Injection | 7.210 |
| Control | 7.351 |

This Example clearly shows that treatment with 1.0 M sodium bicarbonate after onset of rigor mortis increases the tenderness of the meat.

Example 5

In this Example, four cows were slaughtered, disassembled, and the meat from the femoris muscles refrigerated for 72 hours. Biceps were then divided into equal portions and one half injected with 1.0 M sodium bicarbonate and the other portion left untreated. Eight samples from each portion were then subject to Warner-Bratzler shear testing, as noted in Example 5. The results were as follows:

|  | Shear |
|---|---|
| Treatment with 1.0 M Sodium Bicarbonate | 5.595 |
| Control | 7.395 |

This Example clearly shows that treatment with 1.0 M sodium bicarbonate after onset of rigor mortis increases the tenderness of the meat.

Example 6

Here, a very large number of paired pork loins were subjected either to injection of 12% by weight of a standard solution containing sodium lactate, sodium phosphates, salt, and sodium acetate, or injection of the standard solution plus 1.0 M sodium bicarbonate. The loins were then cut into chops and tray packaged for diplay. Table 7 shows product pH at three and five days and percent purge at five days. The "chop control" is untreated loins.

TABLE 7

|  | Three-Day pH | Five-Day pH | Five-Day Purge (%) |
|---|---|---|---|
| Chop Control | 5.74 | 6.68 | 4.27 |
| Chop with Std Soln. | 5.97 | 6.06 | 1.85 |
| Chop with Std. Soln plus 1.0 M NaHCO$_3$ | 6.82 | 6.62 | 0.85 |

This Example shows that the treatment inhibits five-day purge percentage in tray-packaged pork chops as compared to untreated pork chops and pork chops treated with a conventional solution.

Example 7

Here, a very large number of paired pork loins were subjected either to injection of 12% by weight of a standard solution containing sodium lactate, sodium phosphates, salt, and sodium acetate, or injection of the standard solution plus 1.0 M sodium bicarbonate. The loins were left whole and vacuum packed for retail display. Table 8 shows product pH and percent purge at 21 days of display. The "loin control" is untreated loins.

TABLE 8

|  | 21-Day pH | 21-Day Purge (%) |
|---|---|---|
| Loin Control | 5.40 | 1.55 |
| Loin with Std Soln. | 5.58 | 1.16 |
| Loin with Std. Soln plus 1.0 M NaHCO$_3$ | 6.27 | 0.99 |

This Example shows that the treatment 21-day purge percentage in whole loins as compared to untreated loins and loins treated with a conventional solution.

Example 8

In this Example, halothane-positive gilts were individually penned to minimize stress, and fed commercially formulated corn-soybean meal diets ad libitum (18% protein with reduction to 14% at 50 kg live weight). Pigs were slaughtered at an average live weight of 134 kg.

23 such pigs were slaughtered and the biceps femoris and longissumus lumborum muscles excised at 15 minutes post-mortem and injected with a 0.30 M solution of sodium bicarbonate, 10% wt/wt. The longissimus thoracis muscles were also excised, but injected with the same amount (10% wt/wt) of a 0.3 M sodium bicarbonate solution 24 hours post-mortem. pH measurements were taken 24 hours after death for the 15-minute injected samples and 30 hours after death for the 24-hour injected samples. The samples were also measured for color (L*), drip loss (%), quality class, and water percentage. The results are reported in Table 9:

TABLE 9

|  | pH | L* | Drip (%) | Quality[a] | Water % |
|---|---|---|---|---|---|
| *Longissimus Lumborum Injected 15 Min Post-Mortem* | | | | | |
| NaHCO$_3$ | 5.8 ± .2† | 48.2 ± 4.0† | 5.9 ± 1.9† | RFN | 75.2 ± 1.3† |
| Control | 5.5 ± .1 | 53.4 ± 3.3 | 9.2 ± 1.9 | PSE | 73.8 ± .8 |
| *Biceps Femoris Injected 15 Min Post-Mortem* | | | | | |
| NaHCO$_3$ | 5.9 ± .2† | 43.0 ± 4.3† | 5.3 ± 2.5† | n/a[b] | 77.6 ± .8† |
| Control | 5.7 ± .2 | 49.3 ± 4.3 | 6.4 ± 3.4 | n/a | 76.1 ± .5 |
| *Longissimus Thoracis Injected 24 Hour Post-Mortem* | | | | | |
| NaHCO$_3$ | 5.9 ± .2† | 51.4 ± 3.6† | 5.0 ± 1.4 | PFN | 75.6 ± .7† |
| Control | 5.4 ± .1 | 53.6 ± 2.8 | 6.7 ± 2.9 | PSE | 73.8 ± 1.1 |

[a]RFN = red, firm, normal; PFN = pale, firm, normal; PSE = pale, soft, exudative
[b]Not applicable because quality standards have been established exclusively for the longissimus muscle.
†P < .05 between the treatment and control The results show that injection of 0.3 M sodium bicarbonate (10% wt/wt) at either 15 min post-mortem or 24 hr post-mortem significantly improves pH, color, and drip loss. Additionally, as shown by the "Quality" column, injection at either 15 min or 24 hr prevents the onset of the PSE condition. Treatment at either 15 min or 24 hr post-mortem also increases water percentage an average of 1.5%.

What is claimed is:

1. A method of improving drip loss in fresh pork, beef, lamb, and poultry comprising injecting or perfusing a sodium bicarbonate solution having a concentration of about 1.0 molar or less into a swine, cattle, sheep, or fowl carcass or parts thereof after onset of rigor mortis in the carcass.

2. The method according to claim 1, wherein the sodium bicarbonate solution also includes sodium chloride at a concentration of about 1 molar or less.

3. The method according to claim 1, further comprising the step of simultaneously injecting or perfusing sodium pyrophosphate into the carcass or parts thereof.

4. The method according to claim 1, wherein the solution of sodium bicarbonate is injected into a swine carcass or parts thereof.

5. The method according to claim 1, wherein the solution of sodium bicarbonate is perfused into the carcass or parts thereof.

6. The method according to claim 1, wherein a sodium bicarbonate solution having a concentration of from about 0.6 molar to about 1.0 molar is injected or perfused into the carcass or parts thereof.

7. The method according to claim 1, wherein the solution of sodium bicarbonate is injected or perfused into the carcass or parts thereof within 96 hours postmortem.

8. The method according to claim 1, wherein the solution of sodium bicarbonate is injected or perfused into the carcass or parts thereof within 72 hours post-mortem.

9. A method of decreasing the amount of PSE-grade pork from a fresh swine carcass comprising injecting or perfusing an effective PSE-grade-inhibiting amount of a solution of sodium bicarbonate into the fresh carcass or parts thereof after onset of rigor mortis in the carcass.

10. The method according to claim 9, wherein a sodium bicarbonate solution having a concentration of about 1.0 molar or less is injected or perfused into the carcass or parts thereof.

11. The method according to claim 9, wherein the sodium bicarbonate solution also includes sodium chloride at a concentration of about 1 molar or less.

12. The method according to claim 9, further comprising the step of simultaneously injecting or perfusing sodium pyrophosphate into the carcass or parts thereof.

13. The method according to claim 9, wherein the solution of sodium bicarbonate is injected into the carcass or parts thereof.

14. The method according to claim 9, wherein the solution of sodium bicarbonate is perfused into the carcass or parts thereof.

15. The method according to claim 9, wherein a sodium bicarbonate solution having a concentration of from about 0.6 molar to about 1.0 molar is injected or perfused into the carcass or parts thereof.

16. The method according to claim 9, wherein the solution of sodium bicarbonate is injected or perfused into the carcass or parts thereof within 96 hours postmortem.

17. The method according to claim 9, wherein the solution of sodium bicarbonate is injected or perfused into the carcass or parts thereof within 72 hours post-mortem.

18. A method of decreasing the amount of PSE-grade pork from a fresh swine carcass comprising injecting or perfusing a buffered solution of from about 0.6 to about 1.0 molar sodium bicarbonate into the fresh carcass or parts thereof after onset of rigor mortis in the carcass.

19. The method according to claim 18, wherein the buffered solution is injected or perfused into a swine carcass.

* * * * *